United States Patent [19]
Wright, Jr.

[11] 3,732,438
[45] May 8, 1973

[54] SUPERCONDUCTIVE SWITCH APPARATUS

[76] Inventor: Robert C. Wright, Jr., 18 Lafayette Avenue, Hingham, Mass. 02043

[22] Filed: July 26, 1971

[21] Appl. No.: 166,311

Related U.S. Application Data

[62] Division of Ser. No. 750,568, Aug. 6, 1968, Pat. No. 3,646,363.

[52] U.S. Cl. ....................................307/245, 307/306
[51] Int. Cl. ..........................H03k 17/00, H03k 3/38
[58] Field of Search ........................307/212, 245, 306

[56] References Cited

UNITED STATES PATENTS 2,832,897 4/1958 Buck ...............................307/245 X
2,946,030 7/1960 Slade...............................307/245 X

OTHER PUBLICATIONS

"Superconductivity" by E. A. Lynton Methugn & Co., Ltd., dated 1962, pages 15 (lines 5–8).

*Primary Examiner*—Stanley D. Miller, Jr.
*Attorney*—Marn & Jangarathis

[57] ABSTRACT

Apparatus is provided whereby the conductive state of means including an element capable of exhibiting the superconductivity is controlled by the maintenance of said means in intimate thermal communication with a paramagnetic salt. The temperature of such means thereby being discretely and selectively changed by the control of the magnetic state of said paramagnetic salt.

8 Claims, 7 Drawing Figures

SUPERCONDUCTIVE SWITCH APPARATUS

Figure 2:
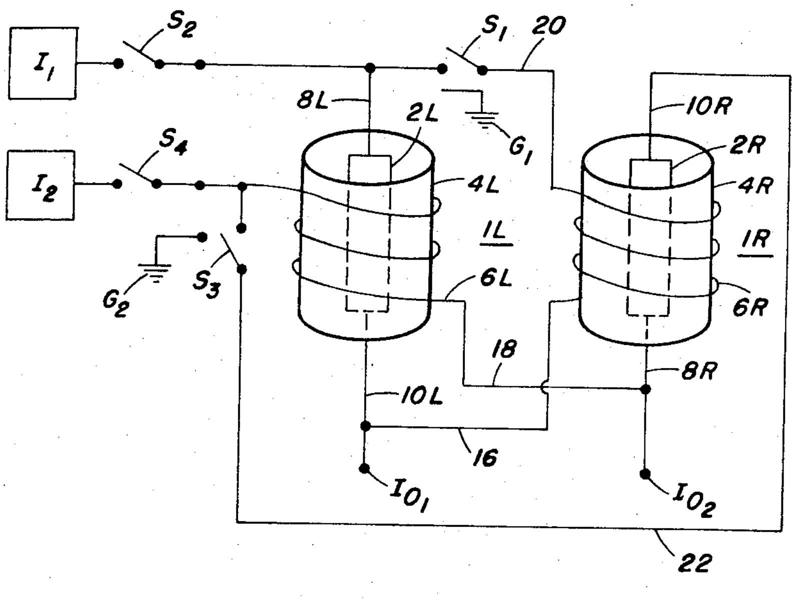

This is a division of U.S. application Ser. No. 750,568 filed Aug. 6, 1968 now U.S. Pat. No. 3,646,363.

This invention relates to superconductive devices and more particularly to a novel superconductive switch which may be instantaneously changed from a first conductive state to a second conductive state in a substantially adiabatic manner. Additionally, this invention relates to particular apparatus utilizing one or more of said superconductive switches to provide power or logic for other superconductive devices present in a cryogenic environment.

It is well known that the electrical resistance of most materials generally decreases with a decrease in the temperature of the material. However, it is equally well known that a certain class of materials, generally referred to as superconductors, while following the above-mentioned rule above a critical temperature, suddenly exhibit essentially zero electrical resistance when the temperature of such materials is lowered below said critical temperature. This class of materials is made up of many metallic elements as well as metal compounds and alloys, each of which has a clearly defined critical temperature at which the resistance suddenly becomes essentially zero. The majority of metallic element superconductors usually have separate critical temperatures which reside only a few degrees above absolute zero (0°K); however, present research has produced superconductive compounds and alloys having clearly defined critical temperatures as high as 18° Kelvin. Additionally, such superconductive materials, when below their critical temperature, exhibit the Meissner effect in that they appear to be diamagnetic as to magnetic field strengths below a given value, which value tends to increase as the temperature below the critical temperature is decreased. Once, however, the magnetic field strength is increased beyond this critical value, the zero resistance state is destroyed. Thus, the value of current that a superconductive device may carry while remaining in the zero resistance state is theoretically limited only to the maximum at which the current flowing through the superconductive device creates a magnetic field at the surface thereof which field approaches the critical magnetic field strength.

The attributes of such superconductive devices have proved to be attractive in regard to uses within the data storage field, in magnet systems, and other fields where the maintenance of a constant circulating current, often referred to as a persistent current, is a desirable feature. Such uses, however, have been greatly curtailed due to present problems associated with the maintenance of a predetermined cryogenic environment which environment is normally provided by surrounding such devices in liquid helium contained in Dowar type apparatus. Thus, an isolated cold zone is utilized to maintain the superconductive apparatus at the selected temperature.

Apparatus which is presently relied on to provide the cold zone for superconductive devices has been found to be highly expensive and inefficient in operation because such apparatus is imperfectly isolated from ambient conditions and also because of the heat produced within the cryogenic environment. A principal deficiency in the isolation of the cold zone has been traced to the use of relatively large copper conductors to connect the superconductive devices present in the cold zone with apparatus external thereto. Such copper conductors have been found to continuously transmit thermal energy to the cold zone from the external environment which energy in the form of heat must be continually dissipated by the cryogenic environment. Furthermore, the same copper conductors, due to their finite resistance, cause joule heating to take place within the area of the cold zone when current flows therein. Although not serious in low current applications, such joule heating has proved to be a severe system deficiency where large currents are applied as in superconductive magnets which utilize hundreds of amperes. Thus, the thermal energy introduced into the cold zone causes boil-off gas cooling to take place at the surfaces of the relatively large copper conductors present in the cold zone thereby rendering the operation of the apparatus for maintaining a cryogenic environment highly expensive and inefficient.

Therefore, it is a principal object of the present invention to provide a substantially adiabatic, superconductive switch for use inside the cold zone which may be rapidly cycled between two states, one of which is superconductive thereby manifesting a zero voltage drop and no joule effect heating and a second state exhibiting normal, finite resistance; whereby the selection of one of such states is determined by the presence or absence of a relatively small magnetic field, enabling the use of relatively small copper conductors with their inherently smaller total of heat conveyance into the cold zone, which presence or absence of said magnetic field causes essentially adiabatic temperature changes to take place in said switch thereby reversibly switching the same with no net heat input into the system.

A further object of this invention is to provide superconductive logic apparatus exhibiting substantially adiabatic switching properties which inherently has no joule effect heating regardless of the current levels present therein.

A further object of this invention is to provide superconductive power supply apparatus manifesting substantially adiabatic switching characteristics which is highly efficient and causes only relatively insignificant amounts of heat to be produced within the cryogenic environment.

A further object is to provide high frequency chopper apparatus for use inside the cold zone wherein closely regulated temperature control is rendered unnecessary.

Other objects and advantages of the invention will become clear from the following detailed description of several embodiments thereof, and the novel features will be particularly pointed out in connection with the appended claims.

The present invention makes use of the unique physical properties of paramagnetic salts to instantaneously change the temperature of an element in thermal communication therewith without the insertion or removal of any net thermal energy into or from a closed system. Although most substances are magnetically neutral, paramagnetic salts have magnetic domains present therein which normally have a random orientation, but which are capable of being aligned. Thus, even though a paramagnetic salt crystal is usually magnetically neutral due to the net field cancellation between the randomly orientated domains, in the presence of an external field, the magnetic domains present therein will align themselves such that the salt crystal will manifest a magnetic polarity. Since the electrons present in such an aligned crystal of paramagnetic salt are at a lower energy level than those of a randomly orientated crystal, heat is given off to the environment when the domains of such a crystal are aligned, and heat is absorbed when the field is removed and the domains are again allowed to relax. Such heat transformations can be made adiabatic if the crystal, in either its nonaligned state or its aligned state, is at the same temperature as its environment. Furthermore, discrete temperature variations can be produced according to the Gibbs Rule with essentially no net input or output of thermal energy from the system. Thus, this invention makes use of the instantaneous, adiabatic change in temperature of such crystals to switch or to augment the switching of a superconductive device between discrete temperatures to thereby cause the superconductive device to become selectively superconductive or nonsuperconductive.

Therefore, in accordance with a first aspect of this invention, a superconductive switch is provided wherein the state of a superconductive device is instantaneously controlled in an adiabatic manner by the magnetic condition of a paramagnetic salt in intimate thermal communication therewith.

According to a second aspect of this invention, a superconductive multivibrator is provided wherein the binary state of the multivibrator is controlled in a substantially adiabatic manner by the magnetic condition of a plurality of paramagnetic salts in thermal communication with the superconductive elements thereof.

Additionally, in accordance with a third aspect of the present invention, a power supply for superconductive devices is provided wherein the operation of the power supply is adiabatically controlled by the magnetic state of a plurality of superconductive devices.

Furthermore, in accordance with a fourth aspect of the present invention a high frequency chopper is provided wherein the operation of a superconductive element is relied upon to enable wide temperature variations in the cryogenic environment surrounding said superconductive element.

Figure 1A:
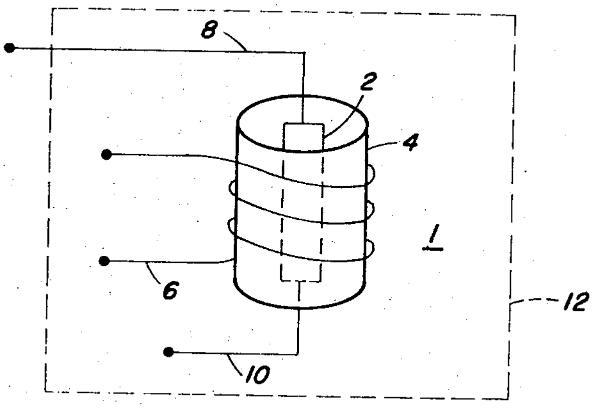
Figure 1B:
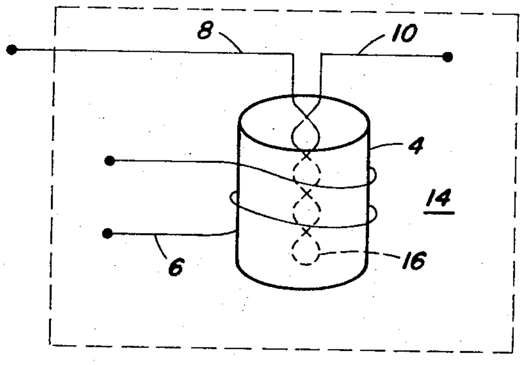
Figure 3B:
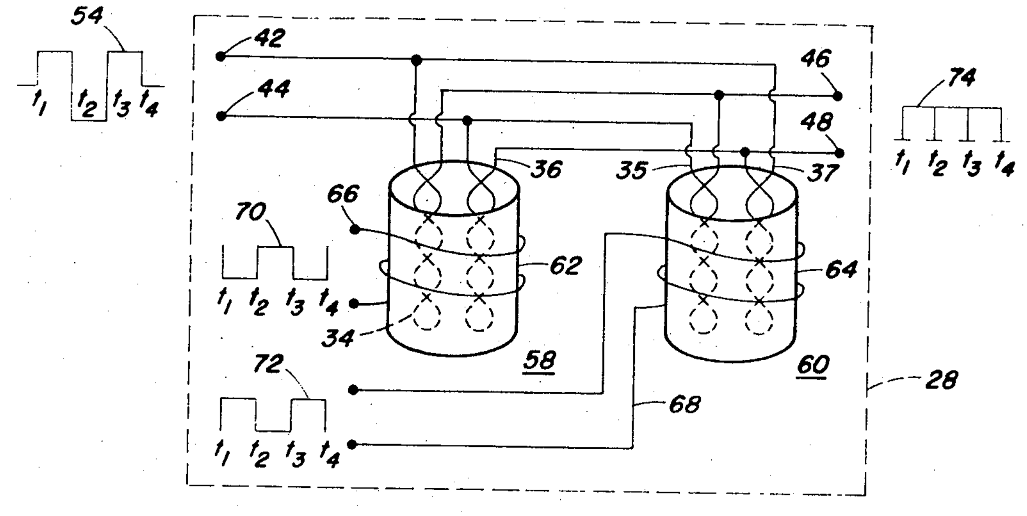
Figure 3A:
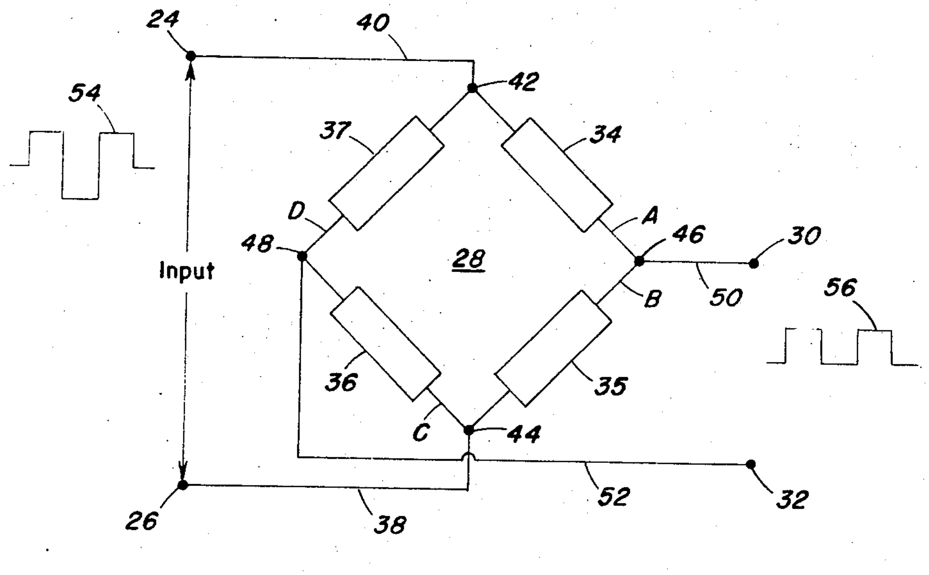
Figure 4A:
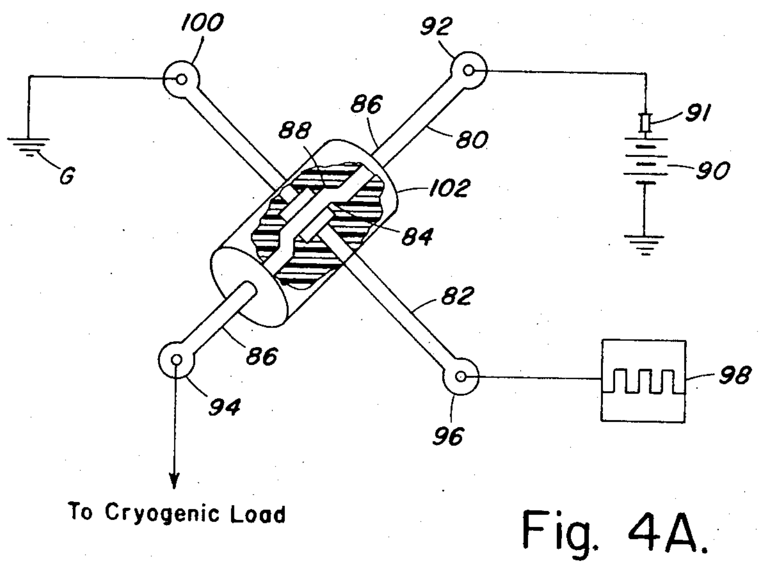
Figure 4B:
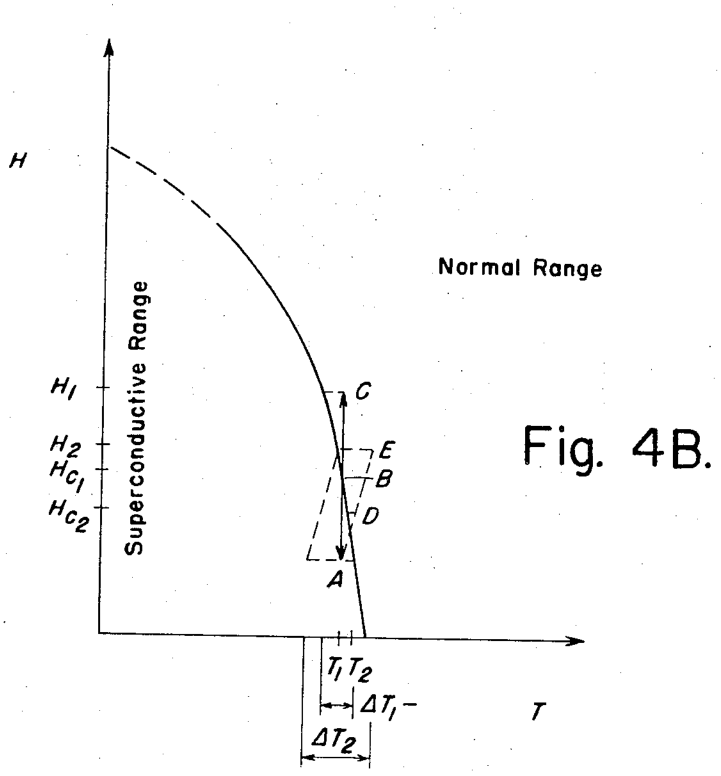

Further objects and aspects of the present invention will be apparent from the operation of the embodiments of the instant invention which are disclosed herein. The operation of the disclosed embodiments of the present invention will be clearly understood from the following description and the accompanying drawings in which:

FIGS. 1A and 1B show preferred forms of superconductive switches according to the present invention;

FIG. 2 embodies a preferred form of a multivibrator device made in accordance with the present invention;

FIGS. 3A and 3B indicate preferred embodiments of a superconductive power supply as contemplated by the present invention; and FIG. 4A shows a preferred form of chopper apparatus made in accordance with the present invention, while FIG. 4B depicts the operating characteristics thereof.

The superconductive switch 1 of the FIG. 1A embodiment comprises a superconductive ribbon 2, paramagnetic salt controlling means 4, and a coil 6. The superconductive ribbon 2 may be formed of any of the well-known class of superconductive materials and although it is shown as a ribbon, it may take any readily available shape. The ribbon 2 which forms the conductive element of the switch 1 has input and output leads 8 and 10 respectively connected thereto. The leads 8 and 10 connected to the superconductive ribbon 2 may be made of ordinary conductor material but are preferably formed of a hard superconductive material which has a higher critical temperature than the superconductive ribbon 2. Thus, any two superconductive materials having several degrees difference between their respective critical temperatures may be used, for instance, if the superconductive ribbon material 2 is made of $Nb_3Al$ which has a critical temperature of approximately 15° Kelvin, the leads 8 and 10 may be formed of $Nb_3Sn$ which has a critical temperature of approximately 18° Kelvin. In such a case the material of the leads 8 and 10 would be considered hard and the material of ribbon 2 would be considered soft.

The superconductive material of the leads 8 and 10 is selected to be above the critical temperature of the ribbon element 2 so that, as will be shown hereinafter, regardless of the state of the ribbon element 2, the leads are always in a superconducting state. The superconducting leads are here preferred to insure that no joule heating takes place within the system.

The paramagnetic salt controlling means 4 may either be a single paramagnetic crystal grown around the superconducting ribbon 2 or powdered crystals packed about the said ribbon 2. Any paramagnetic salt which is readily available may be utilized, such as gadolinium sulfate, cerium fluoride, dysprosium ethyl sulfate, cerium ethyl sulfate, chromium potassium alum, iron ammonium alum, alum mixture, cesium titanium alum, manganese ammonium sulfate, gadolinium nitrobenzene sulfonate, or copper potassium sulfate. The paramagnetic salt controlling means 4 is wound by a plurality of turns of the coil 6 which may be made of ordinary conductor material or a superconductive material having a critical temperature similar to that of leads 8 and 10. Although a coil 6 has been shown, it should be noted that a selectably energized magnet could be substituted therefor to apply the requisite field to the paramagnetic salt controlling means 4. The entire switch apparatus 1 as well as the remainder of the superconductive devices ordinarily connected thereto are maintained within a cryogenic environment which may be supplied by any of the well-known systems presently in use. Since such cryogenic systems are well known and form no part of the present invention per se, the system utilized is merely indicated by the dashed block 12 in FIG. 1A and is not hereinafter shown.

In the description of the operation of the FIG. 1A switch embodiment of the present invention which follows, it will be understood that a current source, which may be any standard source capable of providing the necessary current value, will be connected to the input lead 8 at a point preferably outside of the cryogenic environment 12; and a superconductive utilization device will be connected to the output lead 10 of the switch 1.

Additionally, it is to be understood that a current source is to be connected to the leads of the coil 6 so that the coil 6 can selectively provide a sufficient magnetomotive force (H) to the paramagnetic salt controlling means 4 to change the temperature of the superconductive ribbon 2 by approximately one or two degrees Kelvin. Such a temperature change is desirable to insure that the superconductive ribbon element 2 is switched clearly across the critical temperature range thereof. The magnetomotive force H, which must be applied to the paramagnetic salt to obtain the necessary change in temperature may be calculated by using the relationship that:

$$H_i=\sqrt{\frac{A}{C}\left[\frac{T_1^2}{T_2^2}-1\right]}\approx\sqrt{\frac{A}{C}}\left[\frac{T_1}{T_2}\right]$$

where:

$H_i$ = the magnetomotive force in kilo-oersteds $T_1$ = the temperature with the field on in degrees Kelvin $T_2$ = the temperature with the field off in degrees Kelvin A is a constant and C is the heat capacity of the salt. The ratio of A/C for gadolinium sulfate and chromium potassium alum, two of the more well-known paramagnetic salts, was found to be approximately 0.5 and 1.3, respectively.

With the switch 1 of FIG. 1A connected as stated above, two separate, initial modes of operation, depending on the selected temperature of the environment present within the cryogenic system 12 are possible. If it is assumed for the purposes of explanation, that the critical temperature of the superconductive ribbon 2 is 15° Kelvin and that the cryogenic environment is maintained at 16° Kelvin, a first mode of initial operation of the superconductive switch 1 is dictated. In this first mode of operation, the coil 6 is in the normally energized condition and the system is allowed to initially equalize in temperature such that the cryogenic environment, the superconductive ribbon 2, the leads 8 and 10 and the coil 6 are all maintained at the temperature of the cryogenic environment which, as stated above, is 16° Kelvin. Since the superconductive ribbon element 2 is above its critical temperature, it is in a relatively high resistance state and thus the superconductive switch 1 is in its open condition. Thereafter, the normal resistive state of the ribbon element 2 will be maintained by the current generated by coil 6 even if a slight shift in the temperature of the cryogenic environment should occur. When it is desired to place the superconductive switch 1 in the closed condition, the current source which was driving the coil 6 is de-energized thereby causing the magnetic field which had been applied to the paramagnetic salt control means 4 to collapse. When the magnetic field is removed from paramagnetic salt control means 4, the previously aligned domains present therein will tend to return to their normal state of random orientation which requires additional energy. Thus, the paramagnetic salt, exhibiting the well-known magneto-caloric effect, withdraws this energy from its environment and instantaneously reduces the temperature of the superconductive ribbon element 2 in intimate thermal communication therewith in a substantially adiabatic manner. Where magnetomotive force applied to the paramagnetic salt control means was calculated to be sufficient to change the temperature thereof by 2° Kelvin, the temperature of the ribbon element 2 is lowered by this amount and is thus at approximately 14° Kelvin which is well below its critical temperature. The superconductive ribbon element 2 is thus in its superconductive state and the superconductive switch 1 is in its on condition thereby passing the current present at its input lead 8 to the utilization device connected to its output lead 10 via a zero resistance path. Thus, the superconductive ribbon 2 of the switch 1 has been discretely and selectively switched from its non-superconductive state or off condition to its superconductive state or on condition via the application thereto of a predetermined, instantaneous, and precise temperature change.

The superconductive switch 1 is returned to its off condition by again energizing the current source connected to the coil 6 which is wound about the paramagnetic salt control means 4. When the current source is again energized, a current begins to flow in coil 6 which is of a sufficient magnitude so that the coil 6 applies the previously specified magnetomotive force to the paramagnetic salt control means 4. This magnetomotive force will tend to cause the randomly oriented domains present in the paramagnetic salt control means 4 to align with the applied field so that said paramagnetic salt control means 4 no longer manifests an overall neutral polarity. The degree to which the total number of domains align with the field is determined by the magnitude of the magnetomotive force applied by the coil 6. The electrons present in the domains of the paramagnetic salt, which align, will drop to a lower energy state thereby releasing thermal energy to the environment. The thermal energy which is thereby released is a function of the degree to which the total number of domains align and is thus a function of magnetomotive force applied by the coil. This magnetomotive force, as specified above, will liberate sufficient energy to the environment so that the superconductive ribbon 2 increases in temperature by 2° Kelvin thereby being raised to a temperature of 16° Kelvin which is above its critical temperature. The superconductive ribbon 2 is thus rendered resistive and hence the superconductive switch 1 is placed in its off condition and will remain in said off condition, due to the presence of the magnetic field, even if small temperature changes should occur. Thus, it will be seen that the superconductive switch 1 has been instantaneously returned to the off condition in a substantially adiabatic manner.

A second mode of initiating operation is possible for the FIG. 1A embodiment of the present invention. In this mode of operation, a different set of initial conditions are present, however, once they are established, the superconductive switch 1 is operated in the manner as previously specified. In this case, the superconductive switch 1 is connected to the two current sources and the utilization device mentioned above but, assuming the same critical temperatures mentioned above, the cryogenic environment is initially established at 14° Kelvin and the coil 6 is not energized. Therefore, the isolated cryogenic system is allowed to equalize at a temperature of 14° Kelvin and the superconductive ribbon 2 is initially in the superconductive state and thus the superconductive switch 1 is initially in the on condition. Thereafter, the superconductive switch 1 may be placed in the off condition by the energization of the current source connected to the coil 6. The energization of the coil 6 causes a magnetomotive force to be applied to the paramagnetic salt control means 4 in the manner previously specified thereby causing a portion of the domains therein to align with the applied field and adiabatically release thermal energy to the system. Thus, the superconductive switch 1 is instantaneously switched in an adiabatic manner to its off condition in the same manner as mentioned above. When it is again desired to change the state of superconductive switch 1 to the on condition, the current source connected to the coil 6 is de-energized thereby causing the domains of the paramagnetic salt 4 to regain their random orientation and remove thermal energy from the system in the same manner mentioned above. Thus, although the initial conditions present in the above described second mode of operation differ from those of the first mode of operation stated above, the operation thereafter is the same. Therefore, it will be seen that a superconductive switch has been provided which can be adiabatically and instantaneously controlled by the magnetic condition of a paramagnetic salt in thermal communication therewith.

It should be apparent that although the FIG. 1A embodiment has been described in conjunction with a superconductive ribbon 2, any form or shape of a superconductive element may be used therefor. Thus, a wire or any other usable shape may be utilized and since superconduction is generally accepted to be surface conduction, the superconductive material may be conserved by the utilization of hollow conductors. In addition, it should be apparent that although the superconductive element has been shown threaded directly through the paramagnetic salt control means 4, if large currents are to be used therein, the superconductive element could be doubled back on itself to thereby cancel the field induced in the salt by such currents. Furthermore, a plurality of superconductive elements may be utilized within a single paramagnetic salt control means to create a multiple pole device. Additionally, it should be appreciated that although the superconductive ribbon element 2 of the switch 1 has been shown positioned within the paramagnetic salt control means to link the field applied by the coil 6, which field thereby aids the switching due to the lowering of the critical temperature of the superconductor as mentioned above, the superconductive element may be located perpendicular to the field since field linkage is not mandatory to the successful temperature switching utilized by this invention, provided that a truly closed thermal system can be approached. Finally, it should be pointed out that the term instantaneous as used herein is intended to cover the very fast switching time of the disclosed embodiments of the instant invention which should enable operation in the nanosecond range; however, since time is not generally a thermodynamic parameter, this speed has not been calculated.

The superconductive switch 14 shown in FIG. 1B is a noninductive embodiment of the superconductive switch shown in FIG. 1A. The paramagnetic salt control means 4, the coil 6, the input lead 8 and the output lead 10 utilized with the FIG. 1B embodiment may be identical to those described with regard to the FIG. 1A embodiment and therefor have been given the same reference numerals. The superconductive switch of FIG. 1B comprises the same elements as described with regard to the FIG. 1A embodiment except that a twisted superconductive wire element 16 is substituted for the superconductive ribbon 2 of FIG. 1A. The operation of the FIG. 1B embodiment is as described with regard to the FIG. 1A embodiment and as such will not be repeated here. However, when the FIG. 1B switch 14 is in its on condition, with current thereby passing from the input lead 8 to the output lead 10 through superconductive element 16, any field generated by said current will be canceled. Such cancellation takes place because equal currents pass through the two twisted halves of the superconductive wire element 16 in opposite directions such that the fields generated thereby will be of equal magnitude but opposite in direction and therefore will cancel. This embodiment is preferable when a switch having more than one superconductive element therein is utilized so that there is no inductive coupling between superconductive switch elements in intimate thermal contact with the same paramagnetic control means 4. Additionally, this embodiment is useful when high currents are to be passed through the switch which currents might tend to generate a field capable of aligning the domains of the paramagnetic salt means 4.

The superconductive multivibrator shown in FIG. 2 is a binary logic device which utilizes two of the superconductive switching elements of FIG. 1A. Accordingly, similar switch elements have been given previously utilized notations; however, since the multivibrator is a symmetrical device, each numeral used therewith is followed by a letter designation L or R to indicate the portion of the symmetrical circuit to which it belongs.

The multivibrator of FIG. 2A comprises two superconductive switches 1L and 1R each of which includes, respectively, a superconductive ribbon element 2L and 2R, a paramagnetic salt control means 4L and 4R, and a coil 6L and 6R, which should be made of superconductive material. The superconductive ribbon elements of each switch 1L and 1R are connected to input leads 8L and 8R and output leads 10L and 10R, which leads in this case should be formed of hard superconductive material having a higher critical temperature, as explained with regard to FIG. 1A, than the critical temperature of the superconductive ribbon elements 2L and 2R. The output lead 10L of the switch 1L has an output terminal $I_{01}$ connected thereto and is additionally connected by the lead 16 to one terminal of the switching coil 6R of switch 1R. In similar manner, the input lead 8R of the switch 1R has an output terminal $I_{02}$ connected thereto and is additionally connected by the lead 18 to one terminal of the switching coil 6L of switch 1L. The other terminal of the switching coil 6R of the superconductive switch 1R is connected by lead 20 to switch $S_1$ which in a first position connects to ground $G_1$ and in a second position connects to the junction between the input lead 8L of superconductive switch 1L and the switch $S_2$. The switch $S_2$, when in its closed position, connects the aforementioned junction to the output of the current source $I_1$ which may be any well-known type of current supply. The output lead 10R of the superconductive switch 1R is connected by a conductor 22 to a first terminal of switch $S_3$. The switch $S_3$ connects in a first position to ground $G_2$ and at a second position thereof connects to the junction between a first terminal of switch $S_4$ and a second terminal of the switching coil 6L of the superconductive switch 1L. The switch $S_4$ when in its closed position connects to the output terminal of current source $I_2$, which may be similar in nature to current source $I_1$, or even a separate, selectable output thereof. The connectors 16, 18, 20 and 22 should be made of a suitably hard superconductive material, similar to that utilized for the leads 8L, 8R, 10L and 10R and having a similar critical temperature. The entire apparatus, except for the current sources are maintained in a cryogenic environment, not shown, similar to that utilized with regard to the FIG. 1 embodiment. Additionally, each paramagnetic salt control means 4L or 4R may have a suitable insulating coating such as Teflon thereon, not shown, so that each control means 4L or 4R, together with its respective ribbon elements 2L or 2R may be partially insulated from the overall cryogenic environment thereby enabling the separate temperature of each to be maintained and adiabatic operations approached. The switches $S_1$–$S_4$, which are shown as manual switches for simplicity, may be of any suitable type of electronic switches which are well known in the art or they may be the switches of the FIG. 1 embodiment of the instant invention. It should be appreciated however, that switches $S_1$ and $S_3$ should have superconductive elements therein and if the switches of the FIG. 1 embodiment were utilized, a separate switch should be substituted for each position of the two position switches $S_1$ and $S_3$. Furthermore, it should be noted that if the superconductive switches as shown in FIG. 1 are utilized, multielement superconductive switches could be used where two or more switches operate in unison.

In operation, the multivibrator of FIG. 2 may be used to provide a logic output or to provide storage for a single bit of binary information. The mode of operation of the switches 1L and 1R therein is as explained with regard to FIG. 1 and thus the following detailed explanation of the operation of the multivibrator will only state that a selected switching coil 6L or 6R is energized or deenergized and the selected switch 1L or 1R is thereby placed in its off or on condition. For the purpose of explanation, it may be assumed that the cryogenic environment is set at a sufficiently low temperature so that one of the superconductive switches 1L or 1R, having its switching coil 6L or 6R deenergized will be superconductive or on while the other superconductive switch with its switching coil energized will be nonsuperconductive or off. The off condition will thereafter be maintained by the flux generated by the current flowing in the energized coil. With this cryogenic environment established, all superconductive elements within the circuit with the exception of those inside the superconductive switches will be superconductive because the temperature will be below their critical temperature which is above that of the superconductive ribbon elements 2L and 2R. It is additionally assumed for the purpose of explanation that the switches $S_1$–$S_4$ are initially in positions such that $S_2$ is closed, $S_4$ is open, $S_1$ is at $G_1$ and $S_3$ is at $G_2$. With the switches in these positions, a current path is established from the current source $I_1$ through the closed switch $S_2$ to the input lead 8L of the superconductive switch 1L. The superconductive ribbon element 2L of the superconductive switch 1L is in the superconductive condition, since, as will be shown hereinafter, no current passes through the switching coil 6L thereof. Therefore, the current from the source $I_1$ which is present at input lead 8L passes through the superconductive ribbon element 2L of superconductive switch 1L to the output lead 10L thereof. The current present at output lead 10L is connected via the connector 16 to the switching coil 6R of the superconductive switch 1R thereby maintaining the superconductive ribbon element 2R thereof in the nonsuperconductive condition and hence the superconductive switch 1R is in the off condition. The current from the current source $I_1$, present in the switching coil 6R, thereafter passes via conductor 20 and switch $S_1$ to ground at $G_1$. No current from current source $I_2$ is, under these conditions, circulating in the multivibrator circuit of FIG. 2 because the source $I_2$ is disconnected therefrom and any circulating currents would be dissipated in the superconductive switch 1R which is presently in the off condition or by the connection of the $I_2$ current loop to ground at $G_2$ via switch $S_3$. As soon as the $I_1$ current has been established in the current loop which includes elements $S_2$, 8L, 2L, 10L, 16, 6R, 20 and $S_1$, the switch $S_2$ may be opened and the switch $S_1$ may be switched to its second position to thereby connect the conductor 20 to the junction between switch $S_2$ and input lead 8L. As should be apparent, the current flowing in this closed loop which includes elements 8L, 2L, 10L, 16, 6R, 20 and $S_1$ will continuously circulate therein in the counterclockwise direction because the loop consists entirely of superconductive elements and therefore has zero resistance. Thus, a continuously circulating, persistent current has been established in the $I_1$ current loop which current maintains the superconductive switch 1R in the off condition and represents a first binary logic or information state of the multivibrator. This persistent current will continuously flow in the previously defined loop for months unless the state of the multivibrator is first changed. The persistent current may be sensed or utilized directly by the selective connection of a utilization device to the output terminal $I_{01}$ thereby destroying the information state or sensed indirectly by placing a coil about one of the conductors in the current loop.

When it is desired to change the logic state or insert new binary information into the super conductive multivibrator of FIG. 2, the switch $S_1$ is switched to its grounded position at $G_1$ and switch $S_4$ is thereafter placed in the closed position. The grounding at $G_1$ of switch $S_1$ breaks the previously closed superconductive loop and grounds the same, thereby dissipating the persistent current which had been circulating therein. The closure of switch $S_4$ completes a current path from the current source $I_2$ to the switching coil 6L of the superconductive switch 1L thereby placing it in the off condition. The current thus applied to the switching coil 6L of the superconductive switch 1L is thereafter applied by conductor 18 to the input lead 8R of the superconductive switch 1R. Since there is no longer current present in the switching coil 6R of the superconductor switch 1R, said switch 1R is in the on condition so that current present at input lead 8R is passed through the now superconducting ribbon element 2R to the output lead 10R. The current present at the output lead 10R is applied via conductor 22 to one terminal of switch $S_3$ which has remained connected to ground $G_1$. Once the $I_2$ current has been clearly established in the previously defined path and $I_1$ current has settled, switch $S_4$ is opened and switch $S_3$ is switched from position $G_2$ to the position whereby it connects conductor 22 to the junction between switch $S_4$ and switching coil 6L of the superconductive switch 1L now in the off condition. Thus, a second closed superconducting current loop, which includes elements 6L, 18, 8R, 2R, 10R, 22 and $S_3$, has been established having a clockwise persistent current continuously circulating therein. This persistent current which will continue for several months unless interrupted maintains superconductive switch 1L in the off condition. It too may be destructively sensed or utilized by a selective connection of a utilization device to terminal $I_{02}$ or indirectly readout by the placement of a coil about one of the current carrying elements therein. When it is again desired to change the logic or information state of this superconductive multivibrator, the previously outlined steps with regard to the $I_1$ current loop may again be initiated. It should be noted that if additional current magnitudes are deemed desirable in conjunction with the operation of this multivibrator, the incorporation of a drive winding for use therewith is specifically contemplated. Thus, it can be seen that substantially adiabatic, instantaneously switching, superconductive logic or information storage apparatus, which inherently has no joule effect heating, has been provided according to the instant invention.

The embodiment of the present invention which is depicted in FIG. 3 is a full wave rectifying power supply for a superconductive system usable within a cryogenic environment. The overall operation of this full wave rectifying power supply is shown in diagrammatic form in FIG. 3A while FIG. 3B indicates a specific form of apparatus usable therein.

The full wave rectifying power supply of FIG. 3A comprises input terminals 24 and 26, a full wave rectifying bridge 28, and output terminals 30 and 32. The rectifying bridge 28 includes four arms A-D therein and each arm includes a superconductive switching element or switch 34–37, respectively, which may be of the form shown in FIG. 1. The details of the switching elements 34–37 have not been shown in FIG. 3A in order to avoid initial confusion, however, such details are fully specified with regard to FIG. 3B. The full wave rectifying bridge 28 is connected to the input terminals 24 and 26 via conductors 40 and 38 which are respectively connected to the bridge input terminals 42 and 44. The output terminals 20 and 32 are connected to the bridge output terminals 46 and 48, respectively, by conductors 50 and 52. The conductors 38, 40, 50 and 52 may be made of ordinary conductive material, however, it is preferred that they be formed of hard superconductive material having a higher critical temperature than the soft superconductive switches or switch elements 34–37. The entire apparatus of FIG. 3A is contained within a cryogenic environment which has not been shown.

The explanation of the operation of FIG. 3A will assume that a standard source of alternating current is connected to the input terminals 24 and 26 and that a cryogenic utilization device such as a superconductive magnet is connected to the output terminals 30 and 32 thereof. The alternating current applied to the input terminals 24 and 26, as indicated by the waveform 54, is applied to the bridge input terminals 42 and 44 by conductors 40 and 38, respectively. The superconductive switches or switch elements 34–37 of the bridge arms A-D are switched on or off in pairs, by means more fully described with regard to the embodiment of FIG. 3B, such that elements 34 and 36 are in their on stage when switches 35 and 37 are in their off state and the converse thereof. Thus, the bridge arms A and C are rendered superconductive while bridge arms B and D are nonconductive and bridge arms B and D are rendered superconductive when bridge arms A and C are nonconductive. When bridge arms A and C are superconductive, and arms B and D are nonconductive, a superconductive current path will be established from the bridge input terminal 42 to the bridge output terminal 46 via arm A while a similar path will be established from bridge input terminal 44 to bridge output terminal 48 via arm C. During such a time interval, other possible conductive paths between the input terminals 42 and 44 and output terminals 46 and 48 via arms B and D will be foreclosed due to the nonsuperconductive condition of switch elements 35 and 37. When bridge arms B and D are conductive and arms A and C are non-conductive, a superconductive path will be established from the bridge input terminal 42 to the bridge output terminal 48 via arm D while a similar path will be established from bridge input terminal 44 to bridge output terminal 46 via arm B. During this time interval, other possible conductive paths between the input terminals 42 and 44 and output terminals 46 and 48 via arms A and C will be foreclosed due to the nonsuperconductive condition of switch elements 34 and 36. The aforementioned switch element pairs are gated, as explained in more detail hereinafter, such that bridge arms A and C are superconductive during the time intervals that positive pulses are applied by the current source and bridge arms B and D are superconductive during the time intervals that negative pulses are applied by said current source. Thus, the circuit acts as a full wave rectification bridge and the alternating positive and negative pulses applied thereto are rectified and applied by the bridge output terminals 46 and 48 to the output terminals 30 and 32 as indicated by the waveform 56.

FIG. 3B shows one structural embodiment of the apparatus which may be utilized in the construction of the bridge 28 of FIG. 3A. The same reference annotations used in FIG. 3A have been retained in FIG. 3B so that corresponding portions of each circuit may be easily identified. The rectifying bridge of FIG. 3B comprises bridge input terminals 42 and 44, superconductive switches 58 and 60 and bridge output terminals 46 and 48. The superconductive switches 58 and 60 are the noninductive type of superconductive switches described hereinabove with regard to FIG. 1B, however, each switch has superconductive twisted wire elements therein which correspond to the elements of the opposite sides of the bridge that are switched together. Thus, superconductive switch 58 contains the superconductive switch elements 34 and 36 of arms A and C, respectively, while superconductive switch 60 contains the superconductive switch elements 35 and 37 of arms B and D, respectively, and inductive coupling between opposite bridge arms is avoided. Each of the superconductive switches 58 and 60 includes paramagnetic salt control means 62 and 64, respectively, and switching coil means 66 and 68 all of which are fully described in conjunction with FIG. 1. Again, the paramagnetic salt control means 62 and 64 may each include an insulating coating to maintain the temperature thereof, together with their respective switch elements as well as to aid in adiabatic operation. Each of the superconductive elements 34–37 is connected within its requisite bridge arm A–D, respectively, in the manner previously specified with regard to FIG. 3A so that input terminals 42 and 44 and output terminals 46 and 48 form a bridge configuration.

Since the mode of operation of the overall bridge 28 was stated with regard to FIG. 3A, and the mode of switching of an individual switch was described with regard to FIG. 1, only the mode of switching the bridge arms in sequence with the input signals will be described hereinbelow. As was previously described, the bridge circuit is to operate such that arms A and C are superconductive during the time intervals which correspond to the positive pulses of the waveform 54 while arms B and D are to be superconductive during the time intervals which correspond to the negative pulses of said waveform 54. Thus, if the time intervals corresponding to the positive pulses are those which begin at odd intervals $t_1$, $t_3$ and end at even intervals $t_2$, $t_4$, and those corresponding to the negative pulses are those which begin at even intervals $t_2$, $t_4$ and end at odd intervals such as $t_3$; it is only necessary to gate the superconductive switches 58 and 60 such that switch 58 is in the on condition during the positive pulse time intervals and off during the negative time intervals while the converse of this operation is utilized with regard to superconductive switch 60. The required synchronous signals are shown by waveforms 70 and 72 as being applied to switching coils 66 and 68 of the superconductive switches 58 and 60, respectively. The synchronous signals may be supplied by any standard pulse sources well known in the art and, as should be apparent from the operation described with regard to FIG. 1, when a pulse is applied to one of the switching coils 66 and 68 the superconductive switching elements 34–37 within the respective superconductive switches 58 and 60 are rendered non-superconducting until that pulse terminates. Thus, it is seen that the bridge apparatus depicted in FIG. 3B provides alternate switching of the opposite arms of the superconductive bridge of FIG. 3A so that full wave rectification is provided as shown by the waveform 74.

Although the full wave rectifying bridge embodiment of the instant invention has been described in terms of a cryogenic power supply, it should be obvious that similar structure thereto can be used as a cryogenic D.C. to A.C. converter where the superconductive switches are externally driven. Additionally, where such power supplies are utilized to supply high currents for use in powerful superconductive magnets, further joule heat loss reductions may be achieved by supplying high voltage, low current power to the input of the superconductive bridge circuit and thereafter transforming the rectified output thereof to high current, low voltage power using a transformer means having a very low ratio or secondary to primary windings. Furthermore, it should be obvious that an inverting bridge stage could be connected to the output of the full wave rectifying bridge circuit disclosed in FIG. 3. Such an additional bridge could have switching elements of its respective arms located in the same paramagnetic salt control means used by the rectifying bridge so that the overall circuit still utilized only two superconductive switches which in this case would contain four superconducting switch elements each.

Further modifications of the present circuitry will occur to those of ordinary skill in the art upon perusal of the present cryogenic apparatus. Therefore, it should be understood that the aforementioned modifications are intended only as examples and should in no way be construed to limit the instant invention. Thus, it is seen that a power supply has been provided for cryogenic devices wherein joule heating losses have been substantially reduced due to the utilization of adiabatic switching devices therein.

The embodiment of the instant invention which is depicted in FIG. 4A is a superconductive chopper or D.C. to A.C. converter, which admits of very high frequency operation. As the illustrated apparatus is continuously rapidly cycled between its normal and superconductive states, it has been found to possess the additional attribute of being able to operate in a loosely controlled cryogenic environment. Such operation is often advantageous as the temperature of the cryogenic environment under these conditions need not be constantly monitored or maintained within a few tenths of a degree, as is the case when it is desired to magnetically switch a superconductive element across a narrowly defined, preselected temperature range.

The superconductive chopper or D.C. to A.C. converter depicted in FIG. 4A comprises a controlled element 80, a control element 82, and paramagnetic salt means 84; all of which are maintained in an appropriate cryogenic environment which here has not been shown. The controlled element 80 may take an appropriate shape or form and preferably includes first portions 86 made of a relatively hard superconductive material having a critical temperature substantially above that of the environmental temperature and a second portion 88 which is made of relatively soft superconductive material having a critical temperature slightly above that of the environmental temperature. Thus, the first portions 86 of the controlled element 80 are continuously in their superconductive state while the state of the second portion 88 thereof is determined, as shall hereinafter be seen, by the control element 82 and the condition of the paramagnetic salt means 84. A source of D.C. potential 90 is connected to a first, input terminal 92 of the controlled element 80 via the switch 11 and the second, output terminal 94 thereof is connected to a cryogenic load or utilization device which is generally indicated.

The control element 82 may be an ordinary current carrying conductor, however, since it is desirable to avoid joule effect heating within the system, a hard superconductive material similar to that used with regard to first portions 86 is preferred therefor. The control element 82 is connected at a first terminal 96 thereof to a source of alternating current 98 which is here indicated as a square wave generator, but which may take any convenient form. The second or output terminal 100 of the control element 82 is connected at G to ground as shown.

The paramagnetic salt means 84, which may be a single crystal grown on the controlled element 80, is interposed between the control element 82 and the controlled element 80 in the vicinity of the second, soft superconductive portion 88 thereof and is in intimate thermal communication with said second portion 88. The controlled element 80 is positioned in a nonparallel, partially overlapping relationship with the control element 82, which relationship is preferably perpendicular so that the magnetic field produced by said control element 84 optimumly links said controlled element 80 as well as the paramagnetic salt means 84. The overlapping portion of the controlled element 80 and the control element 82 having the paramagnetic salt means 84 interposed therebetween is preferably encapsulated in a thermally insulative material 102 which may, for example, be teflon. As will be described in more detail hereinafter, the insulating coating provides imperfect insulation which allows the encapsulated elements to slowly approach the temperature of the external environment but provides sufficient insulation so that short duration temperature changes are isolated therefrom, thereby allowing substantially adiabatic operation.

In operation the superconductive chopper or D.C. to A.C. converter illustrated in FIG. 4 is initially allowed to equalize in temperature with the cryogenic environment when the alternating current source 98 and source of D.C. potential are in the deenergized condition. As the teflon encapsulated portion thereof is substantially insulated from its environment by the teflon coating 102 as well as the segments of the controlled element 80 and the control element 82 external to said teflon coating, which segments are in the superconductive state and hence poor heat conductors, an appropriate time interval should be provided so that the encapsulated apparatus can approach the temperature of the cryogenic environment. Thereafter, the depicted apparatus is ready for operation as a superconductive chopper as both the first 86 and second 88 portions of the controlled element 80 will be in the superconductive state and the control element 82, in the preferred embodiment, will be in the superconductive state so long as the alternating current source 98 remains deenergized.

The mode of switching of the apparatus illustrated in FIG. 4A may be best explained in conjunction with FIG. 4B which is a plot of threshold field versus temperature for a superconductor material which may be assumed to be of the type utilized in second portion 88 of the controlled element 80. As can be seen by inspection of the figure, the area under the curve denotes the superconductive regions of the material wherein the material will exhibit zero resistance and additionally will be diamagnetic to fields of lesser value than the critical field strength. The area above the curve represents the normal resistance state of the material where it is not diamagnetic. If such a material is switched in the usual manner from its superconductive state to its normal state by the application of a large magnetic field $H_1$ which comfortably exceeds the critical field strength thereof $H_{C1}$, the change in state is accomplished at a constant temperature $T_1$ and hence the transition will follow the depicted path ABC. This manner of switching, which is commonly in use today, relies on the Meissner effect whereby superconductivity is destroyed by the application of a magnetic field which has a sufficient magnitude to overwhelm the Meissner barrier of the superconductive material. However, such commonly used switching techniques require the application of a substantial field $H_1$ and even when this substantial field is utilized, the cryogenic environment must be maintained within a narrowly defined range as indicated by $\Delta T_1$.

If, however, paramagnetic salt means are placed in intimate thermal communication with the superconductive element which is to be switched, and further if such paramagnetic salt means are positioned so as to have the domains therein aligned by the magnetic field applied to switch the state of the superconductive element, a smaller magnetic field may be utilized as the transition in conductive state does not occur at a constant temperature. Thus, as previously described, when the paramagnetic salt means are placed under the influence of a magnetic field, the randomly oriented magnetic domains therein will tend to align thereby adiabatically releasing energy to the insulated volume in which the controlled element resides and increases the temperature thereof. The critical temperature and field is thereby shifted on the curve shown in FIG. 4B to $T_2$ and $H_2$ respectively whereby the path ADE is followed in switching from the superconductive to the normal state of conductivity. Therefore, it will be seen that the introduction of the paramagnetic salt means introduces a thermal spike to aid in switching across the Meissner barrier thereby enabling a smaller field $H_2$ to be applied in switching the controlled element 80 of the superconductive apparatus depicted in FIG. 4A. Further, the limits to which the temperature of the environment must be controlled have been substantially increased to a value readily obtainable by the state of the art as indicated by $\Delta T_2$, due to the utilization of the thermal spike produced by the paramagnetic salt means to augment the magnetic switching. It should be noticed that the limits of temperature control of the external environment may be further increased by an increase in the applied field $H_2$ and the converse of this situation also holds true above the curve.

The augmented switching principles described above have been relied upon in the chopper or D.C. to A.C. converter apparatus depicted in FIG. 4A. Thus, after the encapsulated portions of the apparatus illustrated in FIG. 4A have been allowed to equalize to the temperature $T_1$ of the cryogenic environment, the source of D.C. potential 90 and the source of alternating current 98 are energized. Upon the energization of the source of alternating current 98 a signal having the waveform of a square wave is applied to the control element 82. The magnitude of each current pulse applied by the source of alternating current 98 is sufficient to generate a field of a value $H_2$ which exceeds the critical field strength necessary for the thermally augmented switching as described above. Thus, with each current pulse applied by the source of alternating current 98, the second, relatively soft portion 88 of the controlled element 80 is driven into the nonsuperconductive area above the FIG. 4B curve by the thermally augmented switching action of the field $H_2$ generated thereby. As the field $H_2$ tends to align the randomly orientated domains within the paramagnetic salt means 84, thereby releasing the energy which creates the thermal spike, and the volume within which this energy is released is insulated from the cryogenic environment by the coating 102, the superconductive member 82 and the superconductive portions 86; the raise in temperature within the enclosed volume will be maintained for a period of time. Thus, during this period of time, the temperature of the volume will aid in maintaining the second portion 88 in the normal state so that the entire maintaining force need not be provided by the field $H_1$ which can therefore be, if desired, below the necessary critical field strength. Further, as the released energy was retained within the insulated volume when the second portion 88 was driven normal, such energy will be available in the requisite amount to provide for the increased energy state of said paramagnetic salt means 84 when the domains therein tend to regain their random orientation due to the release of the magnetic field at the termination of a given current pulse. Thus, a negative thermal spike will be available to return the second portion 88 thereof to the superconductive range. Therefore, if the state of the second, soft superconductive portion 88 is cycled within this time period, the switching of the paramagnetic salt will be substantially adiabatic so that no net increase in thermal energy is present.

As the frequency of the current pulses supplied by alternating current source 98 can be made very large with respect to the aforementioned time period, due to the instantaneous switching which enables high frequency operation, second soft superconductive portion 88 of the controlled member 80 is adiabatically and instantaneously switched into the normal state by the leading edge of each pulse supplied by the alternating current source 98 and instantaneously and adiabatically switched back into the superconductive state by the trailing edge of each of said pulses.

Since the second portion 88 of the controlled member is thereby alternately switched between its normal state and its superconductive state by the field applied by the control element 82 and the thermal spike provided by paramagnetic salt means 84, the potential applied to input terminal 92 of the controlled element 80 by the source of potential 90 will alternately be applied to the cryogenic load connected to output terminal 94 thereof. Furthermore, this alternating potential will have substantially the same frequency as the alternating current source 98 because the switching of the second, soft superconductive portion 88 is substantially instantaneous. In addition, as the potential source 90 may be a high voltage, low current source, no field which causes substantial interference with the operation of the depicted D.C. to A.C. converter will be produced; however, if a high current application is required, the alternating voltage produced thereby may be later transformed in the manner suggested with regard to the preceding embodiment.

Thus, it will be seen that a high frequency chopper has been provided in accordance with the teachings of the instant invention.

While the invention has been described in connection with several preferred embodiments thereof, it will be understood that many modifications will be readily apparent to one of ordinary skill in the art; and that this application is intended to cover any adaptations or variations thereof. Therefore, it is manifestly intended that this invention be only limited by the claims and the equivalents thereof.

What is claimed is:

1. A cryogenic switch comprising:
means including an element capable of exhibiting superconductivity and having a first state at a first temperature and a second state at a second temperature;
paramagnetic salt means in intimate thermal communication with said element means and controlling the state thereof; and
means to apply a magnetic field to said paramagnetic salt means, said paramagnetic salt means, upon the energization of said magnetic field applying means, switching said element means from one of said states to the other of said states.

2. The superconductive switch of claim 1 wherein said paramagnetic salt is powdered and physically surrounds said element means.

3. The superconductive switch of claim 1 wherein said paramagnetic salt constitutes a crystal grown on said element means.

4. The apparatus of claim 1 wherein the means to apply a magnetic field to said paramagnetic salt means includes a member capable of carrying current spatially overlapping a portion of said means including an element capable of exhibiting superconductivity, said paramagnetic salt means being interposed between said member capable of carrying current and said means including an element capable of exhibiting superconductivity at the overlapping portions thereof.

5. The superconductive switch of claim 1 wherein said first state is essentially a zero resistance state and said second state is a relatively high resistance state, said first temperature being below a clearly defined range and said second temperature being above said clearly defined range.

6. The superconductive switch of claim 5 additionally comprising means to initially maintain the ambient environmental temperature of said element means at essentially said second temperature, whereby said means to apply a magnetic field to said paramagnetic salt means is normally energized and said switch is normally in the off condition.

7. The superconductive switch of claim 5 additionally comprising means to initially maintain the ambient environmental temperature of said element means at essentially said first temperature, whereby said means to apply a magnetic field to said paramagnetic salt means is normally de-energized and said switch is normally in the on condition.

8. The superconductive switch of claim 7 wherein said paramagnetic salt means constitutes a crystal grown about said element means.

* * * * *